(12) United States Patent
Subbotin

(10) Patent No.: US 7,486,819 B2
(45) Date of Patent: Feb. 3, 2009

(54) SAMPLING IMAGES FOR COLOR BALANCE INFORMATION

(75) Inventor: Igor Subbotin, South Pasadena, CA (US)

(73) Assignee: Aptina Imaging Corporation (KY)

( * ) Notice: Subject to any disclaimer, the term of this patent is extended or adjusted under 35 U.S.C. 154(b) by 749 days.

(21) Appl. No.: 10/742,902

(22) Filed: Dec. 23, 2003

(65) Prior Publication Data

US 2005/0134702 A1   Jun. 23, 2005

(51) Int. Cl.
  G06K 9/00   (2006.01)
  G06K 9/48   (2006.01)
  H04N 9/73   (2006.01)
  G03F 3/08   (2006.01)

(52) U.S. Cl. .................... 382/167; 382/199; 348/223.1; 358/518

(58) Field of Classification Search .............. 348/223.1, 348/655; 358/516, 518; 382/162, 167
See application file for complete search history.

(56) References Cited

U.S. PATENT DOCUMENTS

| | | | |
|---|---|---|---|
| 4,922,330 A | 5/1990 | Saito et al. | |
| 4,954,884 A | 9/1990 | Nakayama et al. | |
| 5,274,440 A * | 12/1993 | Miyazaki | 348/655 |
| 5,448,292 A | 9/1995 | Matsui et al. | |
| 5,457,477 A | 10/1995 | Wang et al. | |
| 5,555,022 A * | 9/1996 | Haruki et al. | 348/223.1 |
| 5,659,357 A | 8/1997 | Miyano | |
| 5,953,058 A * | 9/1999 | Hanagata | 348/223.1 |
| 5,995,665 A * | 11/1999 | Maeda | 382/232 |
| 6,563,602 B1 | 5/2003 | Uratani et al. | |
| 6,707,491 B1 * | 3/2004 | Choi | 348/223.1 |
| 6,757,427 B1 * | 6/2004 | Hongu | 382/164 |
| 6,785,329 B1 * | 8/2004 | Pan et al. | 375/248.08 |
| 6,791,606 B1 * | 9/2004 | Miyano | 348/223.1 |
| 6,826,316 B2 * | 11/2004 | Luo et al. | 382/305 |
| 6,956,967 B2 * | 10/2005 | Gindele et al. | 382/167 |
| 7,009,639 B1 * | 3/2006 | Une et al. | 348/223.1 |
| 2002/0101516 A1 * | 8/2002 | Ikeda | 348/223 |
| 2003/0048368 A1 * | 3/2003 | Bosco et al. | 348/272 |

* cited by examiner

*Primary Examiner*—Samir A Ahmed
*Assistant Examiner*—Michael A Newman
(74) *Attorney, Agent, or Firm*—Dickstein Shapiro LLP

(57) ABSTRACT

Pixels from an image are sampled for auto white balance (AWB) statistics. To avoid the effects of monochromatic regions, only pixels located at or near edges between monochromatic regions and neighboring regions are sampled for computation of the AWB gains. A sampling criteria is applied to each pixel that automatically excludes pixels in monochromatic regions of any size. As a result, white balancing is based only on portions at or near edges of substantially monochromatic regions.

20 Claims, 6 Drawing Sheets

SAMPLING IMAGES FOR COLOR BALANCE INFORMATION

FIELD OF THE INVENTION

The present invention relates to adjusting the color gains in an imaging system to compensate for the variations in illumination spectra attributable to different illumination sources.

BACKGROUND OF THE INVENTION

One of the most challenging problems in color image processing is adjusting the color gains of a system to compensate for variations in illumination spectra incident on an imaging sensor, also known as "white balance". The human eye and brain are capable of "white balancing." If a human observer takes a white card and exposes it under different kinds of illumination, it will look white even though the white card is reflecting different colors of the spectrum. If a person takes a white card outside, it looks white. If a person takes a white card inside and views it under fluorescent lights, it looks white. When viewed under an incandescent light bulb, the card still looks white. Even when placed under a yellow light bulb, within a few minutes, the card will look white. With each of these light sources, the white card is reflecting a different color spectrum, but the brain is smart enough to make it look white.

Obtaining the same result with a camera or other imaging device is harder. When the white card moves from light source to light source, an image sensor "sees" different colors under the different lights. Consequently, when a digital camera is moved from outdoors (sunlight) to indoor fluorescent or incandescent light conditions, the color in the image shifts. If the white card looks white when indoors, for example, it might look bluish outside. Alternatively, if it looks white under fluorescent light, it might look yellowish under an incandescent lamp.

The white balance problem stems from the fact that spectral emission curves of common sources of illumination are significantly different from each other. For example, in accordance with Plank's law, the spectral energy curve of the sun is shifted towards the shorter wavelengths relative to the spectral energy curve of an incandescent light source. Therefore, the sun can be considered to be a "blue-rich" illuminator while an incandescent bulb can be considered to be a "red-rich" illuminator. As a result, if the color processing settings are not adjusted, scenes illuminated by sunlight produce "bluish" imagery, while scenes illuminated by an incandescent source appear "reddish".

In order to compensate for changes in illumination spectra, the gains of color processing systems and/or imagers should be adjusted. This adjustment is usually performed to preserve the overall luminance (brightness) of the image. As a result of proper adjustment, gray/white areas of the image appear gray/white on the image-rendering device (hence the term "white balance"). In the absence of specific knowledge of the spectra of the illumination source, this adjustment can be performed based on an analysis of the image itself to obtain color balance information, i.e., information about the luminance of colors in the image.

One conventional approach to computing the proper adjustment to the color gains is based on the premise that all colors are represented equally in complex images. Based on this assumption, the sums of all red, green and blue components in the image should be equal (in other words, the image should average to gray). Following this approach, the overall (average over the entire image) luminance Y, and red (R_avg), green (G_avg) and blue (B_avg) components are evaluated. The color gains (G_red, G_Green, G_blue) are then selected so that $Y = G\_red * R\_avg = G\_green * G\_avg = G\_blue * B\_avg$.

This conventional approach produces reasonable color rendition for images containing a large number of objects of different colors or large gray areas. However, if the image contains any large monochrome regions, the conventional approach fails. This is the case in many practical situations. Typical examples of such images with a large area having only one color include landscapes in which a significant portion of the image is occupied by either blue sky or green vegetation. Other examples include close-up images of people, wherein flesh tones occupy a significant portion of the image. Yet another example is a non-gray wall serving as a background of the image.

In all of the above examples with large monochrome areas, the averages of the color components of the image would not be equal. An adjustment of the gains based on such proportions would not produce a properly white-balanced image. In other words, the conventional approach to white balancing an image does not correctly compensate if an image includes large monochrome regions.

As depicted in FIG. 1, other procedures for white balancing subdivide an image frame into a plurality of subframes, and each subframe is analyzed to determine if that subframe is predominantly monochromatic other than gray or white. If so, that subframe is excluded from the computation of the gain adjustments. As a result, the white balance process is performed using only multicolored and/or gray subframes. As shown in FIG. 1, each subframe marked with an "X" is determined to be monochromatic, and is excluded from the white balancing operation.

However, the use of such methods in a system often requires large computing and memory resources. Implementation in a system which supports different frame sizes also presents difficulties. It would be advantageous to have improved white balancing techniques.

BRIEF SUMMARY OF THE INVENTION

The present invention provides exemplary embodiments in which statistical analysis of an image is performed to obtain color balance information. The statistical analysis samples pixels that meet a criterion for multichromatic regions. The color balance information can then be used to perform white balancing.

One exemplary embodiment provides a method that selects pixels from an image and uses their values to obtain auto white balance (AWB) statistics. Only pixels located at or near edges between monochromatic regions and neighboring regions are sampled. The AWB statistics are used for computation of the AWB gains. This sampling criteria automatically excludes monochromatic regions of any size from sampling. As a result, overall white-balance of the image is shifted only when a change in color average is due to a change in spectra of illumination, and not due to the presence of large monochromatic areas in the image. The method thus avoids the effects of monochromatic regions in the image, and also minimizes demands on computation and memory requirements, while not depending on frame size.

Other features and advantages of the present invention will become apparent from the following description of the invention which refers to the accompanying drawings.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the present invention.

The term "pixel" refers to a picture element in an image. Digital data defining an image may, for example, include one or more values for each pixel. For a color image, each pixel's values may include a value for each color, such as red, green, and blue.

The term "pixel cell" refers to a picture element unit cell containing a photosensor and devices, such as transistors, for converting electromagnetic radiation to an electrical signal. Typically, fabrication of all pixel cells in an imager will proceed simultaneously in a similar fashion.

Exemplary embodiments of the invention obtain color balance information for an image by statistical analysis. The statistical analysis selects a sample of pixels in the image by applying a criteria that is likely to be met only by pixels in multichromatic regions, i.e., regions, that are not monochromatic. The values of the pixels in the sample are then used to obtain color balance information such as the average total luminance Y as well as average partial luminances for red (R_avg), green (G_avg), and blue (B_avg). These luminances can then be used to perform white balancing.

Figure 1:
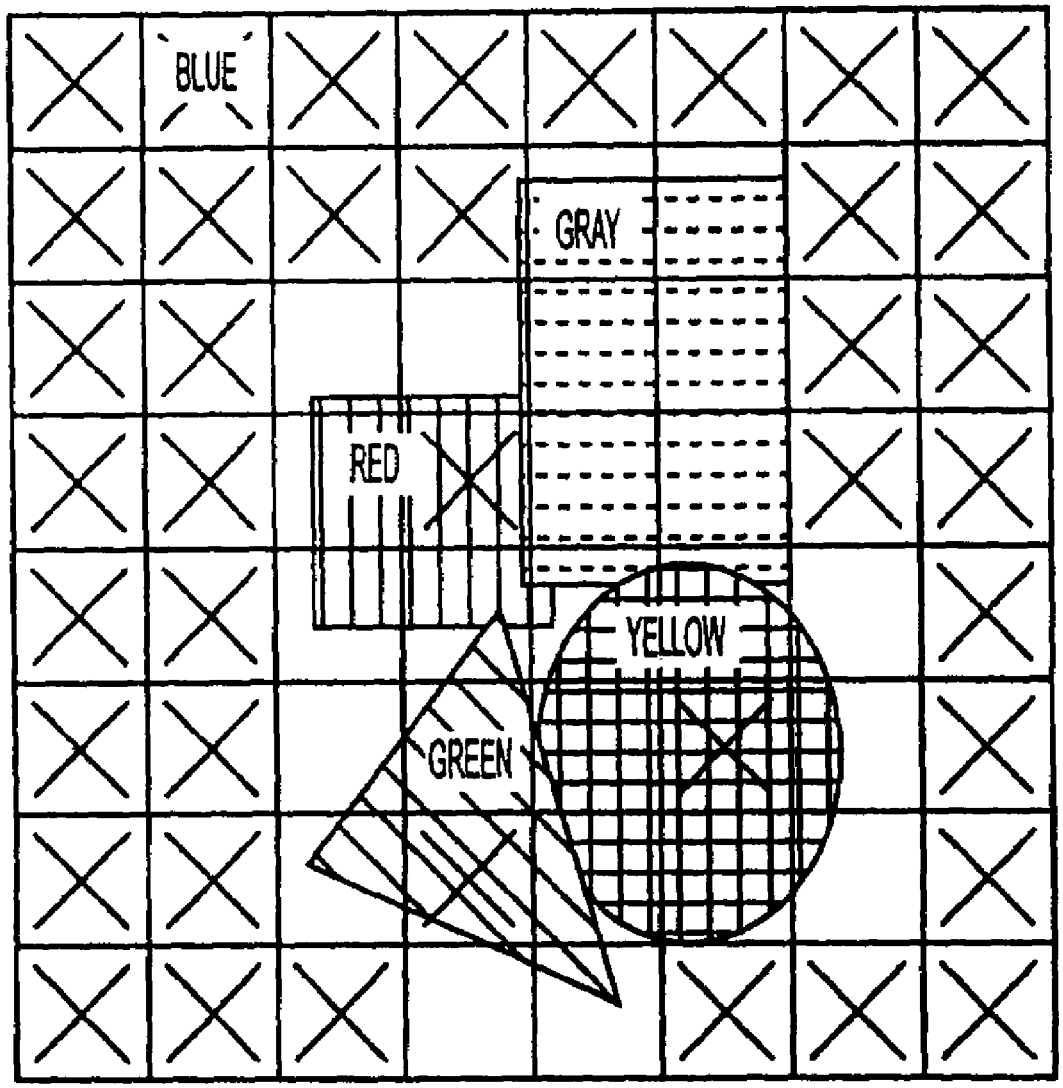
FIG. 1 illustrates a method of subdividing an image frame into a plurality of subframes for a white balancing operation.
Figure 2:
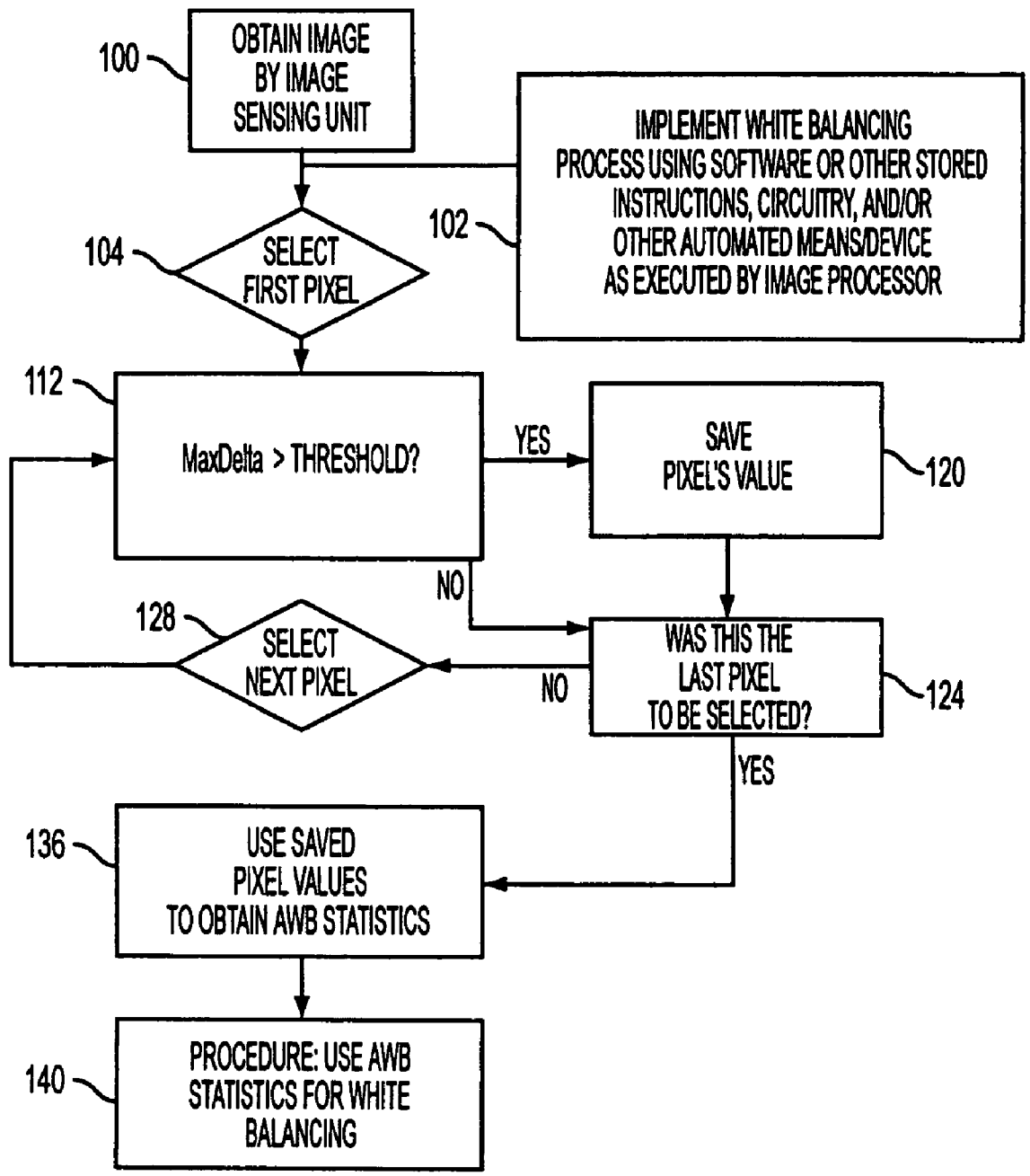
FIG. 2 is a flowchart of a white balancing operation in accordance with an exemplary embodiment of the invention.

FIG. 2 shows an exemplary embodiment in which the sampling criterion is whether the maximum difference (Max Delta) between a pixel's value and each of a set of nearby pixels exceeds a threshold. The threshold is set such that the criterion is likely to be met only by pixels in multichromatic regions; more specifically, pixels which are not associated with monochromatic regions of an image, or pixels at or near edges between monochromatic regions and other regions, are likely to meet the criterion.

As depicted in FIG. 2, after obtaining an image by an image sensing unit (100), a white balancing process (102) is performed using instructions, either as software or in stored memory, specialized circuitry, and/or other automated means or device for execution by an image processor (102). After the white balancing process (102) is completed, a first pixel is selected (104) for measurement of the pixel's signal value.

The signal value of a pixel is used to determine whether the pixel will be used to obtain AWB statistics for white balancing operations. As depicted in step (112), the sampling criterion is whether the maximum difference (Max Delta) between a pixel's value and each of a set of nearby pixels exceeds a threshold. Acceptance of the pixel value for AWB statistics, depicted as a "Yes" response to the inquiry "MaxDelta>Threshold?" in step 112, depends on this sampling criterion. If MaxDelta exceeds the determined threshold, the pixel's value is saved (120). After saving the pixel value, the next step in the white balancing operation is to determine whether the selected pixel is the last pixel (124). If MaxDelta does not exceed the threshold, the operation proceeds directly to step 124 without saving the pixel value.

If Max Delta does not exceed the threshold, and the selected pixel is not the last pixel for sampling (124), the next pixel is selected (128), and the threshold determination "MaxDelta>Threshold?" is again performed in step 112. The "next pixel" may be any pixel from an image selected, for example, by a sampling operation, such as an operation utilizing one or more sampling algorithms. Any other pixel-selection method may be employed, including but not limited to random sampling of pixels in the image, or alternatively, any method or operation that tends to select pixels not associated with monochromatic regions of an image. The same operation steps, as described above with reference to FIG. 2, are performed until it is determined in step 124 that the last pixel from an image has been selected.

The above-described sampling criteria excludes pixels from AWB gains computation that are not likely to be at or near edges of monochromatic regions. In this manner, as many different colors as possible may be included in AWB statistics calculations. No one color-occupied large region, including any monochromatic region, in the picture will dominate. Using this edge detection method, white balanced pictures may be obtained from real sensors after computer AWB calculation.

As depicted in FIG. 2, once it is determined that a selected pixel is the last pixel from an image for sampling (124), the white balancing operation proceeds to use the saved pixel values to obtain AWB statistics (136). The AWB statistics are then used in AWB calculations to perform the white balancing operation (140).

Figure 3:
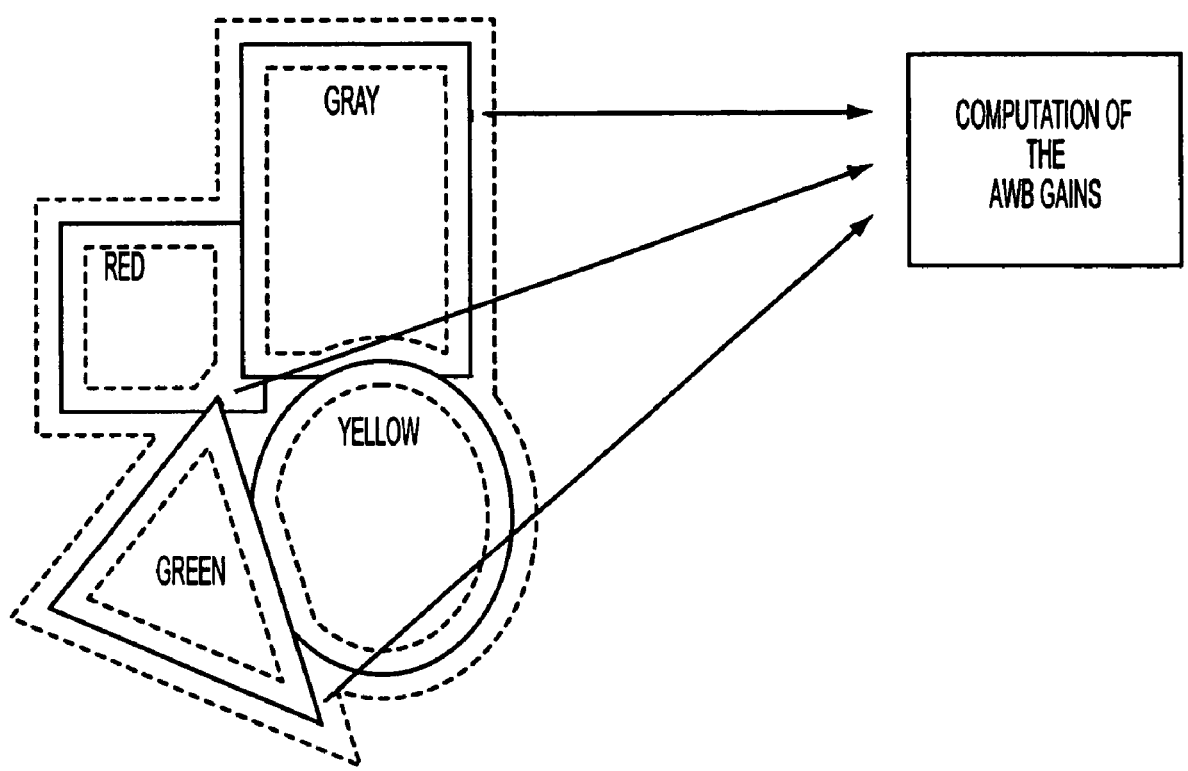
FIG. 3 is a schematic diagram illustrating computation of AWB gains by selecting pixels substantially at or near the edges of monochromatic regions.

As depicted in FIG. 3, only pixels located at or near the edges of monochromatic regions and neighboring regions are used for computation of the AWB gains. Monochromatic regions of any size are automatically excluded from computation and overall white-balance of the image is shifted only when a change in color average is due to a change in spectra of illumination, and not due to the presence of large monochromatic areas in the image. In this manner, the edge detection system operates to select pixels that are either not associated with monochromatic regions of an image, or pixels that are likely to be located at or near the edges of monochromatic regions. The edge detection system minimizes or avoids the effects of monochromatic regions in an image, while not depending on frame size.

Figure 4:
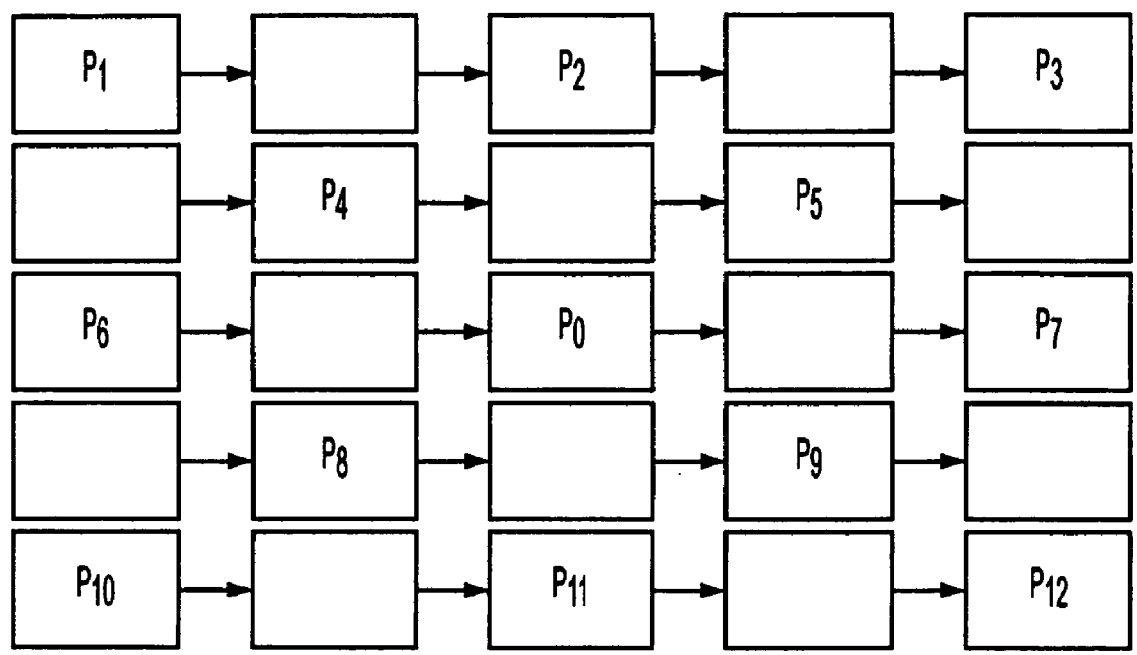
FIG. 4 is a schematic diagram of a pixel neighborhood within which a sampling criterion is applied in FIG. 2.

FIG. 4 depicts an embodiment in accordance with the present invention, in which one or more pixels can be sampled and their respective signal values measured according to the edge detection criterion described in FIG. 2. For example, the array of pixels shown schematically in FIG. 4 represents a region in which pixels may be sampled according to the sampling criterion described in FIG. 2. The sampling criterion employed is whether the maximum difference (Max Delta) between a pixel's value and each of a set of nearby pixels exceeds a threshold.

Referring to FIG. 4, one way to obtain Max Delta is to compare the value of a current pixel for a given color with values of neighbor pixels for the same color. In a Bayer-type pattern, for example, every other pixel is a green pixel. In such a Bayer-type pattern, pixels $P_0$ through $P_{12}$ are thus all of the same color, for example all green pixels. In one embodiment, as shown in FIG. 4, the pixels are arranged in a diagonal arrangement relative to one another; for example, pixel $P_1$ is along an upward and leftward diagonal from pixel $P_0$.

Pixel $P_0$ may be selected first for measurement of its signal value. The value of pixel $P_0$ is compared with the value of a nearby pixel of the same color, e.g. pixel $P_4$. The same determination, that is measuring the difference between the value of pixel $P_0$ compared with the value of a nearby pixel of the same color, can be obtained for each of a set of nearby pixels $[P_1, P_2, \ldots P_{12}]$, as shown in FIG. 4. In one embodiment, Max Delta can be obtained by finding the maximum of the measured differences, as expressed in the following equation:

$$\mathrm{MaxDelta} = \max(|P_o - P_1|, |P_o - P_2|, \ldots |P_o - P_{12}|)$$

If Max Delta is greater than an appropriate threshold, then pixel $P_0$ is likely to either not be associated with a monochromatic region, only associated with a multichromatic region, or located at or near an edge of a monochromatic region, and is selected for AWB statistical analysis.

Once a pixel has been analyzed, and a pixel is excluded or not from use in a white balance algorithm depending on the pixel's edge location or not, the white balancing process, represented schematically as procedure 140 in FIG. 2, may be performed using the non-excluded pixels in any known method or algorithm that effectuates the adjustment of the balance between the color components in the image. For example, color balancing procedure 140 in FIG. 2 may be performed by summing each of the values for red, green and blue, respectively, and weighting the sums so that the three components are equal, whereupon each of the individual pixel datum is adjusted by the weighted value for the corresponding color component.

An exemplary embodiment of an imaging apparatus 200 incorporating features discussed above is shown in FIG. 5. Apparatus 200 includes a lens system 202 for directing light from an object to be imaged to the image sensing unit 204 including an image sensor having a pixel array that provides analog image signals. Analog-to-digital converter 206 converts the analog image signals from image sensing unit 204 into digital signals. Image processor 208 performs image correction processes on the digital signals including a process 100 of automatic white balancing as described above and also other processes such as data correction for defective pixels, color interpolation, sharpness filtering, etc., producing digital image data. Process 100 can be implemented as instructions stored in memory and executed by processor 208, or as a peripheral device or other specialized circuitry that performs upon request from processor 208. Output format converter/compression unit 210 converts the digital image data into an appropriate file format for being outputted or displayed to the user. Controller 212 controls the operations of the entire imaging apparatus 200.

In one embodiment, the image sensor in the image sensing unit 204 is constructed as an integrated circuit (IC) that includes pixels made of a photosensitive material such as silicon. The IC can also include, as part of lens system 202, an array of microlenses over the pixels. The image sensor in unit 204 may be complementary metal oxide semiconductor (CMOS) sensor or a charge compiled device (CCD) sensor, and the IC can also include the A/D converter 206, processor 208, such as a CPU, digital signal processor or microprocessor, output format converter 210 and controller 212.

Without being limiting, such an imaging apparatus 200 could be part of a computer system, camera system, scanner, machine vision system, vehicle navigation system, video telephone, surveillance system, auto focus system, star tracker system, motion detection system, image stabilization system and other visual systems, all of which can utilize the present invention.

Figure 5:
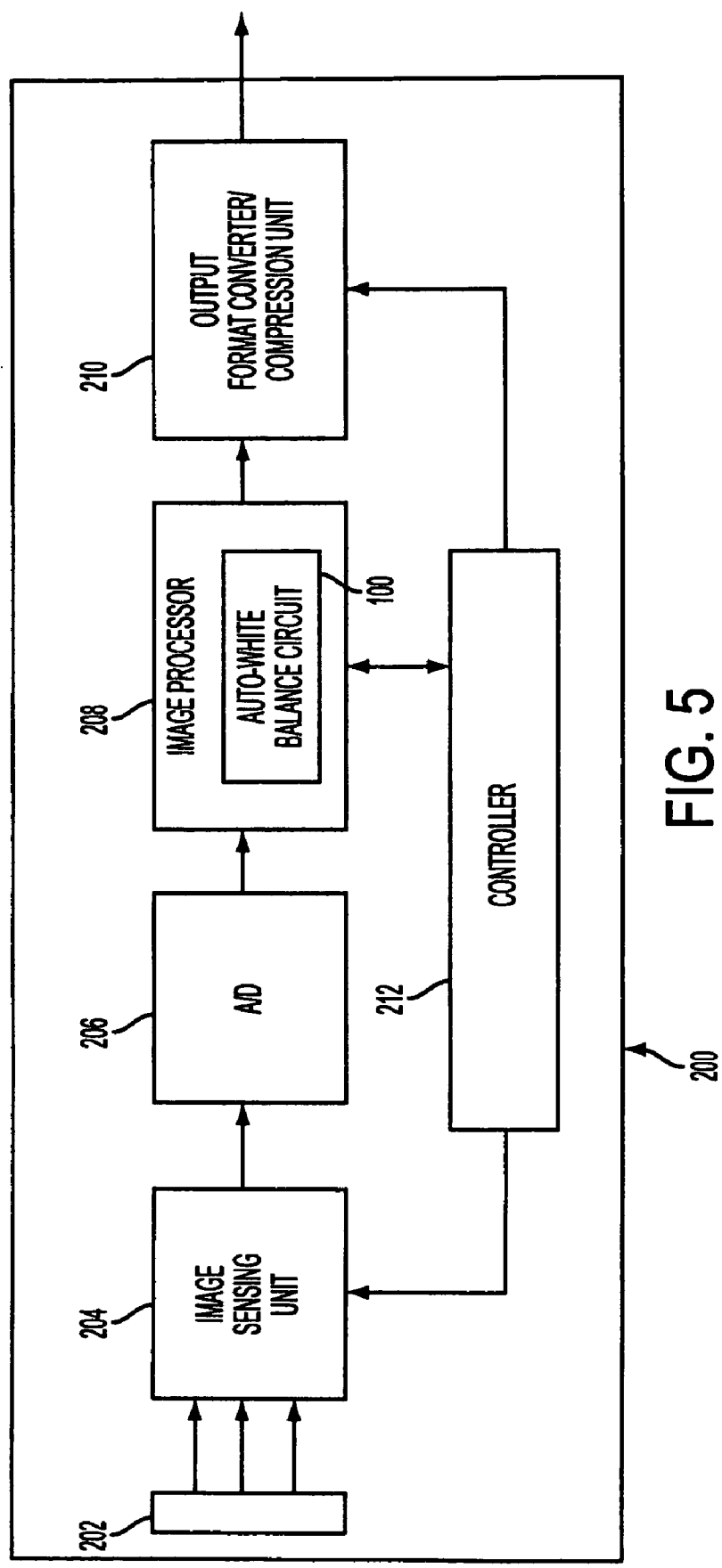
FIG. 5 is a schematic block diagram of an imaging apparatus that performs automatic white balance in accordance with an exemplary embodiment of the present invention; and, FIG. 6 is a schematic block diagram of a processing system that includes an imaging apparatus as in FIG. 5.
Figure 6:
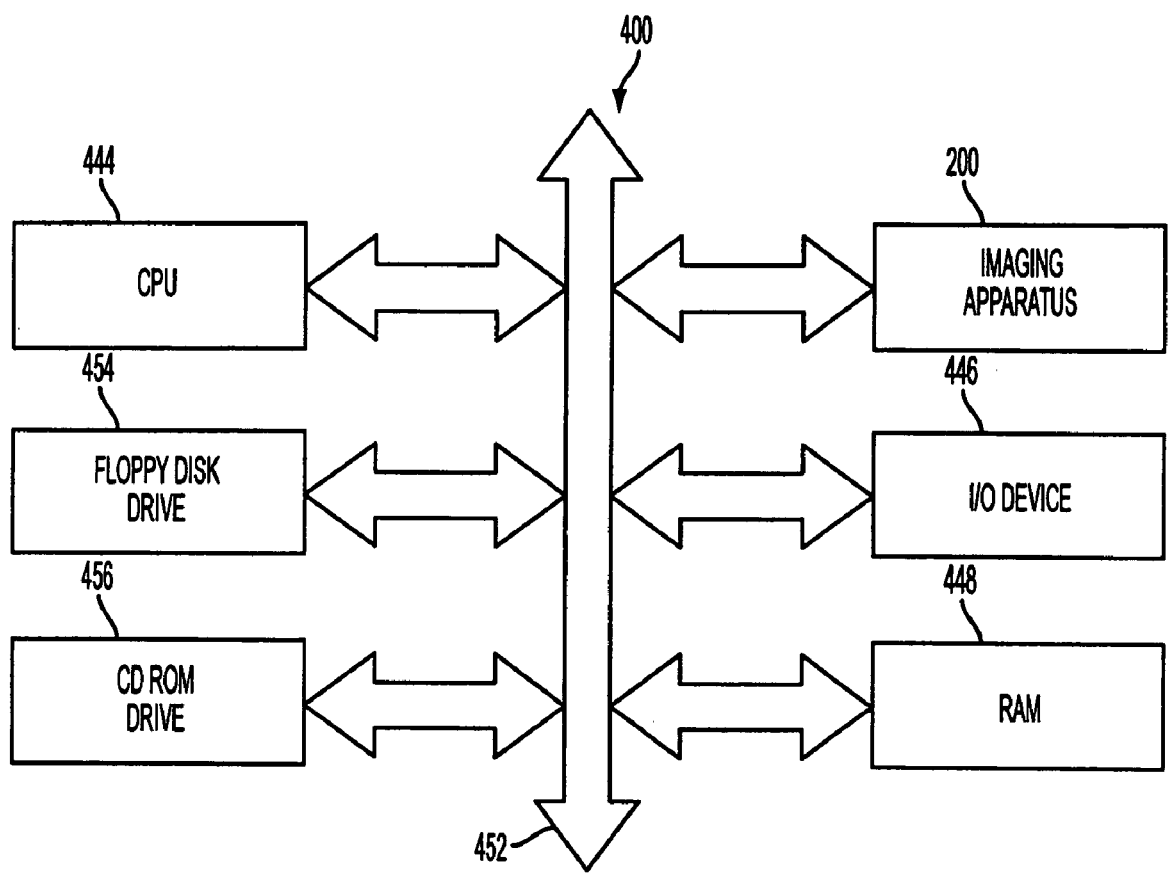

FIG. 6 shows an exemplary embodiment in which processor system 400, such as a computer system, includes an imaging apparatus 200 as in FIG. 5. System 400 includes a central processing unit (CPU) 444 that communicates with an input/output (I/O) device 446 over a bus 452. The imaging apparatus 200 communicates with CPU 444 and other components of the system over bus 452 or a ported connection. The processor system 400 also includes random access memory (RAM) 448, and, in the case of a computer system, may include peripheral devices such as a floppy disk drive 454 and a compact disk (CD) ROM drive 456 which also communicate with CPU 444 over the bus 452.

In one embodiment, the invention provides for an image processing apparatus comprising an image sensing unit for receiving an image and outputting an image signal which includes pixel image data for each line of the image; an image processor for processing the image signal; and a controller for controlling the image sensing unit and the image processor, wherein the image processor includes a monochrome detection circuit; and a white balancing circuit which calculates a white balance of an image based only on portions of the image at or near the edge of a substantially monochromatic region.

The above description and drawings illustrate embodiments which achieve the objects of the present invention. Although certain advantages and embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

What is claimed is:

1. A method for performing a white balance operation on an image, comprising:

comparing a value of each pixel in the image against a value of every pixel for detecting the same color within a Chebyshev distance of at least one pixel to determine whether each pixel is substantially at or near the edge of a monochromatic region;

selecting only pixels that are in either multichromatic or monochromatic regions and substantially at or near the edge of a monochromatic region; and using the selected pixels to obtain color balance information on the image.

2. A method for performing a white balance operation on an image, comprising:

using a value of each pixel in the image to determine whether the pixel is substantially at or near the edge of a monochromatic region;

selecting only pixels that are in either multichromatic or monochromatic regions and substantially at or near the edge of a monochromatic region; and performing a white balance operation on the image to obtain color balance information using the selected pixels, wherein the determination of whether or not a pixel is at or near the edge of a substantially monochromatic region comprises measuring the differences in pixel values between the pixel and every pixel for detecting the same color within a Chebyshev distance of at least one pixel and comparing a maximum measured difference with a threshold.

3. A method for selecting a set of pixels in a Bayer pattern image, the method comprising:
applying a sampling criterion to a plurality of pixels in the image, a pixel being likely to meet the sampling criterion only if the pixel is in either a multichromatic or monochromatic region and substantially at or near the edge of a monochromatic region; and
using values for the selected set of pixels to obtain color balance information for the image,
wherein the sampling criterion is whether a maximum difference value exceeds a given threshold value, the maximum difference value being obtained by calculating the highest measured difference between each pixel's value and the value of every pixel for detecting the same color within a Chebyshev distance of at least one pixel.

4. The method of claim 3, wherein the sampling criterion is applied to all pixels in the image.

5. The method of claim 3, wherein the color balance information includes luminance of each of a set of colors.

6. The method of claim 3, further comprising using the color balance information to perform white balancing on the image.

7. A computer readable storage medium storing software product code for causing a processor to perform a white balancing operation, comprising:
a first set of stored instructions for causing a processor to compare a value of each pixel in the image against a value of every pixel for detecting the same color within a Chebyshev distance of at least one pixel to determine whether each pixel is substantially at or near the edge of monochromatic region in the image, and to select only pixels that are in either multichromatic or monochromatic regions and substantially at or near the edge of a monochromatic region; and
a second set of stored instructions for causing the processor to use the values for the selected set of pixels to obtain color balance information for the image.

8. An apparatus for performing a white balancing operation, comprising:
a first means for selecting a set of pixels in an image by applying a sampling criterion, a pixel being likely to meet the sampling criterion only if the pixel is in either a multichromatic or monochromatic region and substantially at or near the edge of a monochromatic region; and
a second means for using values for the selected set of pixels to obtain color balance information for the image,
wherein the sampling criterion is applied to a pixel by determining whether a maximum difference value exceeds a given threshold value, the maximum difference value being obtained by calculating the highest measured difference between the pixel's value and the value of every pixel for detecting the same color within a Chebyshev distance of at least one pixel.

9. The method according to claim 2, wherein performing the white balance operation comprises:
calculating a respective sum of all luminance values for each color component in the selected pixels;
determining a weight for each respective sum so that the color components are equal; and
adjusting the luminance values for each pixel in the image according to the determined weight for each color component.

10. A method for performing a white balance operation on a raw image, comprising:
comparing a signal value of each pixel from an image with signal values of every pixel for detecting the same color within a Chebyshev distance of at least one pixel;
determining whether or not each pixel is substantially at or near the edge of a monochromatic region based on the comparison of signal values;
eliminating each pixel determined not to be in either a multichromatic or monochromatic region and substantially at or near the edge of a monochromatic region from consideration for white balancing the image; and
performing a white balance operation using the remaining edge pixels.

11. An image processor comprising a white balancing circuit configured to compare a value of each pixel in the image against the value of every pixel for detecting the same color within a Chebyshev distance of at least one pixel to determine whether each pixel is substantially at or near the edge of monochromatic region in the image and use only pixels that are in either multichromatic or monochromatic regions and substantially at or near the edge of a monochromatic region in the image to obtain color balance information on the image.

12. An image processing apparatus comprising:
an image sensing unit for receiving an image and outputting an image signal that includes pixel data for each pixel of the image; and
an image processor for processing the image signal, the image processor configured to compare a value for each pixel of the image against the value of every pixel for detecting the same color within a Chebyshev distance of at least one pixel to determine whether each pixel is substantially at or near the edge of monochromatic region in the image and use only pixels that are in either multichromatic or monochromatic regions and substantially at or near the edge of a monochromatic region in the image to obtain color balance information on the image.

13. An image processing apparatus comprising:
an image sensing unit for receiving an image and outputting an image signal which includes pixel image data for each line of the image;
an image processor for processing the image signal; and
a controller for controlling the image sensing unit and the image processor,
wherein the image processor includes:
a monochrome detection circuit for determining differences between values of each pixel in the image and every pixel for detecting the same color within a Chebyshev distance of at least one pixel; and
a white balancing circuit for calculating a white balance of an image based only on selected pixels, wherein pixel selection is based on pixels that are in either multichromatic or monochromatic regions and substantially at or near the edge of a monochromatic region.

14. A processing system, comprising:
a processor; and
an imaging apparatus that provides image data to the processor, the imaging apparatus comprising
an image sensing unit for receiving an image and outputting an image signal that includes pixel data for each pixel of the image; and
an image processor for performing a white balancing process based only on pixels that are in either multichromatic or monochromatic regions and substantially at or near the edge of monochromatic regions, the pixels being identified by a comparison of values of each pixel in the image and every pixel within a Chebyshev distance of at least one pixel.

15. The method of claim 1, wherein the act of comparing further comprises comparing the value of each pixel in the image against a value of all pixels within a Chebyshev distance of at least one pixel.

16. The method of claim 1, wherein the image is a raw image.

17. The computer readable storage medium of claim 7, wherein the stored instructions cause the processor to compare the value of each pixel in the image against every pixel within a Chebyshev distance of at least one pixel.

18. The method of claim 10, wherein the Chebyshev distance is two pixels.

19. The image processor of claim 11, wherein the white balancing circuit is configured to compare the value of each pixel in the image against every pixel within a Chebyshev distance of at least one pixel.

20. The image processing apparatus of claim 12, wherein the image processor compares the value of each pixel in the image with every pixel within a Chebyshev distance of at least one pixel.

\* \* \* \* \*